US010242215B2

United States Patent
Mahkovec et al.

(10) Patent No.: US 10,242,215 B2
(45) Date of Patent: *Mar. 26, 2019

(54) CONTENT PREVIEW INCLUDING SHARABLE INFORMATION

(71) Applicant: Dropbox, Inc., San Francisco, CA (US)

(72) Inventors: Ziga Mahkovec, San Francisco, CA (US); Christopher Beckmann, San Francisco, CA (US); Rian Hunter, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,698

(22) Filed: Aug. 2, 2017

(65) Prior Publication Data

US 2017/0329990 A1 Nov. 16, 2017

Related U.S. Application Data

(63) Continuation of application No. 14/103,713, filed on Dec. 11, 2013, now Pat. No. 9,740,874.

(51) Int. Cl.
*H04L 29/06* (2006.01)
*G06F 21/62* (2013.01)
(52) U.S. Cl.
CPC .............................. *G06F 21/6218* (2013.01)

(58) Field of Classification Search
CPC . G06F 21/6218; G06F 17/2235; H04L 67/02; H04N 21/6175; H04N 21/4122; H04N 21/435; H04N 21/8586
See application file for complete search history.

(56) References Cited

U.S. PATENT DOCUMENTS

| 9,740,874 B2* | 8/2017 | Mahkovec | G06F 21/6218 |
| 2014/0101722 A1* | 4/2014 | Moore | H04L 63/062 |
| | | | 726/4 |
| 2015/0019690 A1* | 1/2015 | Sarat | H04L 67/02 |
| | | | 709/219 |
| 2015/0195330 A1* | 7/2015 | Lee | H04L 67/02 |
| | | | 709/204 |

* cited by examiner

*Primary Examiner* — Kim T Nguyen
(74) *Attorney, Agent, or Firm* — Polsinelli PC

(57) ABSTRACT

A user of a content management system can store one or more content items at the user's account with the system. In some instances, the system can generate and present a preview of a content item of interest (e.g., a content item selected by the user). In addition to the preview of the content item, the system can generate and present a web address or other machine-readable code referring to (or otherwise associated with) the preview of the content item. Various embodiments of the present disclosure can enableh the web address or other machine-readable code to be sharable and to provide access to the content item (or a copy thereof). For example, the user who is previewing the content item can share the web address of the preview with one or more other users. The one or more users can then access the content item via the web address.

20 Claims, 9 Drawing Sheets

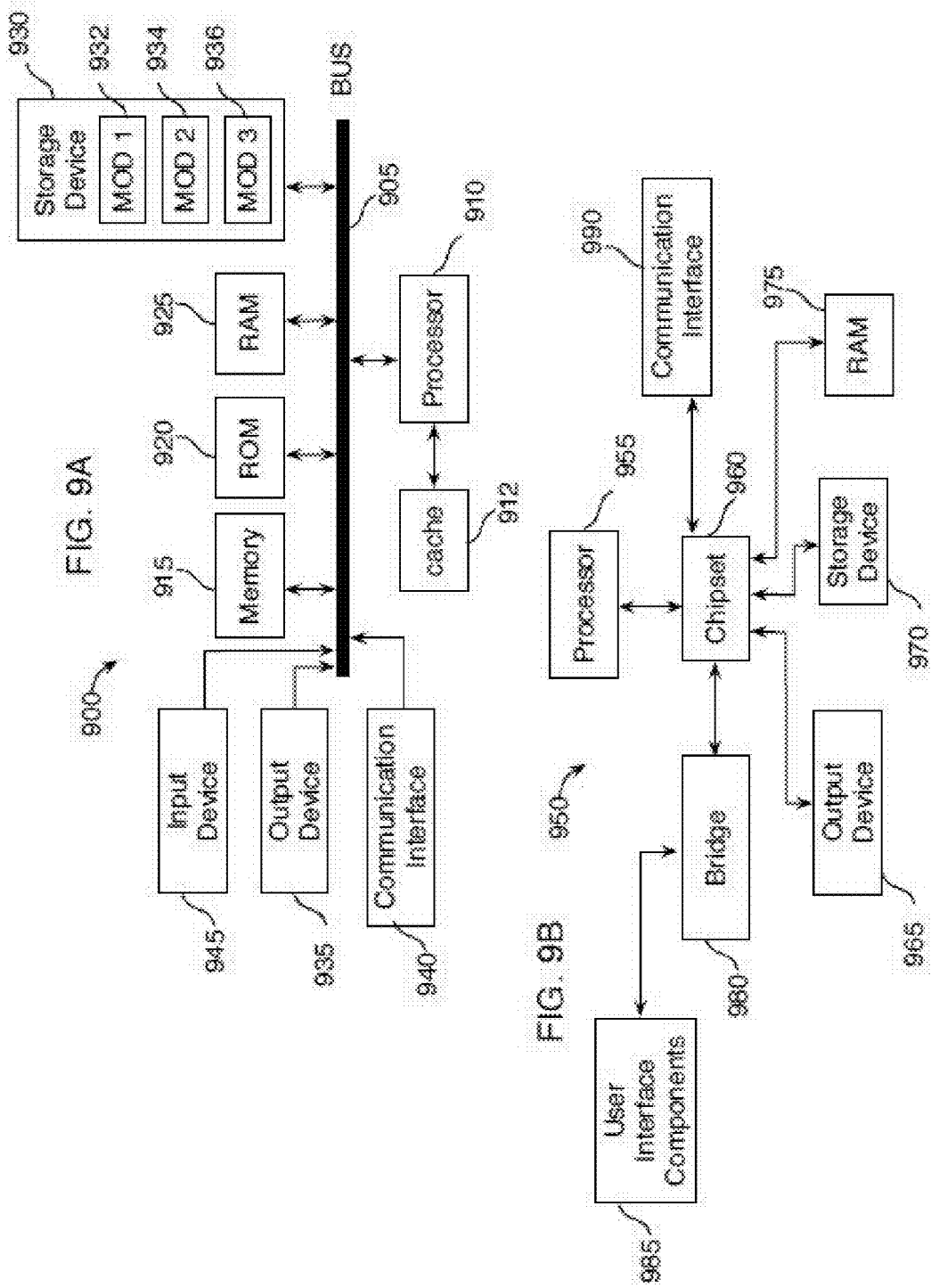

CONTENT PREVIEW INCLUDING SHARABLE INFORMATION

CROSS-REFERENCE TO RELATED APPLICATIONS

This application is a continuation of U.S. application Ser. No. 14/103,713, entitled, "CONTENT PREVIEW INCLUDING SHARABLE INFORMATION," filed on Dec. 11, 2013; which is hereby expressly incorporated herein by reference in its entirety.

TECHNICAL FIELD

The present technology pertains to previewing content, and more specifically pertains to providing sharable information in conjunction with content preview.

BACKGROUND

Online content storage is becoming more popular. People frequently store, access, or otherwise interact with content stored at online content management systems. Documents, pictures, music, videos, directories, folders, and other types of content items can be stored at online content management systems to be accessed by users of the online content management systems.

In some cases, a user of an online content management system can store a collection(s) of content items at the user's account with the online content management system. In other words, the user can be the "owner" of the collection(s) of content items. In some embodiments, a collection of content items can include (but is not limited to) a file, a directory, a document within a directory, a photo album, a media playlist, data, etc.

In one example, the user (i.e., owner) can decide to preview a content item. The user can use a web browsing application to navigate to a web interface provided by the online content management system. The user can interact with the web interface, such as by performing a mouse click on a clickable element, to cause the content management system to provide a preview of the content item. The user can then preview the content item provided by the content management system via the web browsing application.

Continuing with the example, the user can decide that he wants to share the content item with other users. In the web browsing application used to preview the content item, there can be a web address provided along with the preview for the content item. The user might attempt to share this web address with other users. However, in conventional approaches, the web address provided with the preview cannot grant access to the content item for other users (e.g., "recipient users," "recipients"). As such, this can be inconvenient or troublesome to the user. This and other concerns can create challenges for the overall user experience associated with previewing and sharing content via the online content management system.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing content preview including sharable information. A content management system can store various collections of content items. A user of the content management system can store one or more content items at the user's account with the content management system. The content management system can provide a web interface for interacting with the content items. In some cases, the user may desire to preview a content item. The system can cause a preview of the content item to be generated, such as in response to a user-initiated instruction/command (e.g., a mouse click, a tap, etc.). In one example, the preview for an image file can correspond to a display of the image (e.g., thumbnail image preview, full-screen image preview, etc.). In another example, the preview of a document can include a rendering of text included in the document. In a further example, the preview of a media content item can correspond to a playing of at least a portion of the media content item.

In some embodiments, there can be a machine-readable code (e.g., web address, URL address, QR code, etc.) associated with the preview of the content item. In one example, the content management system can generate the preview of the content item, obtain a URL address that uniquely corresponds to the content item, and present the URL address along with the preview. In some instances, the content management system can check a database to determine whether a unique (i.e., substantially unique) URL address already exists for the content item. If so, the content management system can retrieve/utilize the already existing URL address that corresponds to the content item. Otherwise, the content management system can generate a URL address that uniquely corresponds to the content item. The content management system can present the URL address in conjunction with the preview of the content item.

Continuing with the example, various embodiments of the present disclosure can enable the URL address (or other machine-readable code) for the preview to be sharable. In other words, the present disclosure can enable a user previewing the content item to share the URL address presented along with the preview. The URL address can be shared with one or more other users (e.g., recipients). Instead of being unable to access the content item via the shared URL address, the present disclosure can enable the recipient users to navigate to the shared URL address and view, download, or otherwise access the content item (or a copy thereof).

It is important to note that the various embodiments and/or examples discussed herein are for illustrative purposes only. A person having ordinary skill in the art would recognize various other manners or approaches that can be utilized consistent with the scope of the present disclosure. Various other functions and advantages are described and suggested below as may be provided in accordance with the various embodiments.

BRIEF DESCRIPTION OF THE DRAWINGS

The above-recited and other advantages and features of the disclosure will become apparent by reference to specific embodiments thereof which are shown in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9A shows an exemplary possible system embodiment for implementing various embodiments of the present technology; and FIG. 9B shows an exemplary possible system embodiment for implementing various embodiments of the present technology.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for improving ease of use and/or access to content items hosted on a content management system. In some embodiments, a collection(s) of content items can be stored at an online content management system. A user of the content management system can store one or more content items at the user's account with the content management system. In some instances, the content management system can generate and present a preview of a content item of interest (e.g., a content item selected by the user). In addition to the preview of the content item, the content management system can generate and present a web address or other machine-readable code referring to (or otherwise associated with) the preview of the content item. Various embodiments of the present disclosure can enable the web address or other machine-readable code to be sharable and also to provide access to the content item (or a copy thereof). For example, the user who is previewing the content item can share the web address of the preview with one or more other users. The one or more users can then access the content item via the web address.

Figure 1:
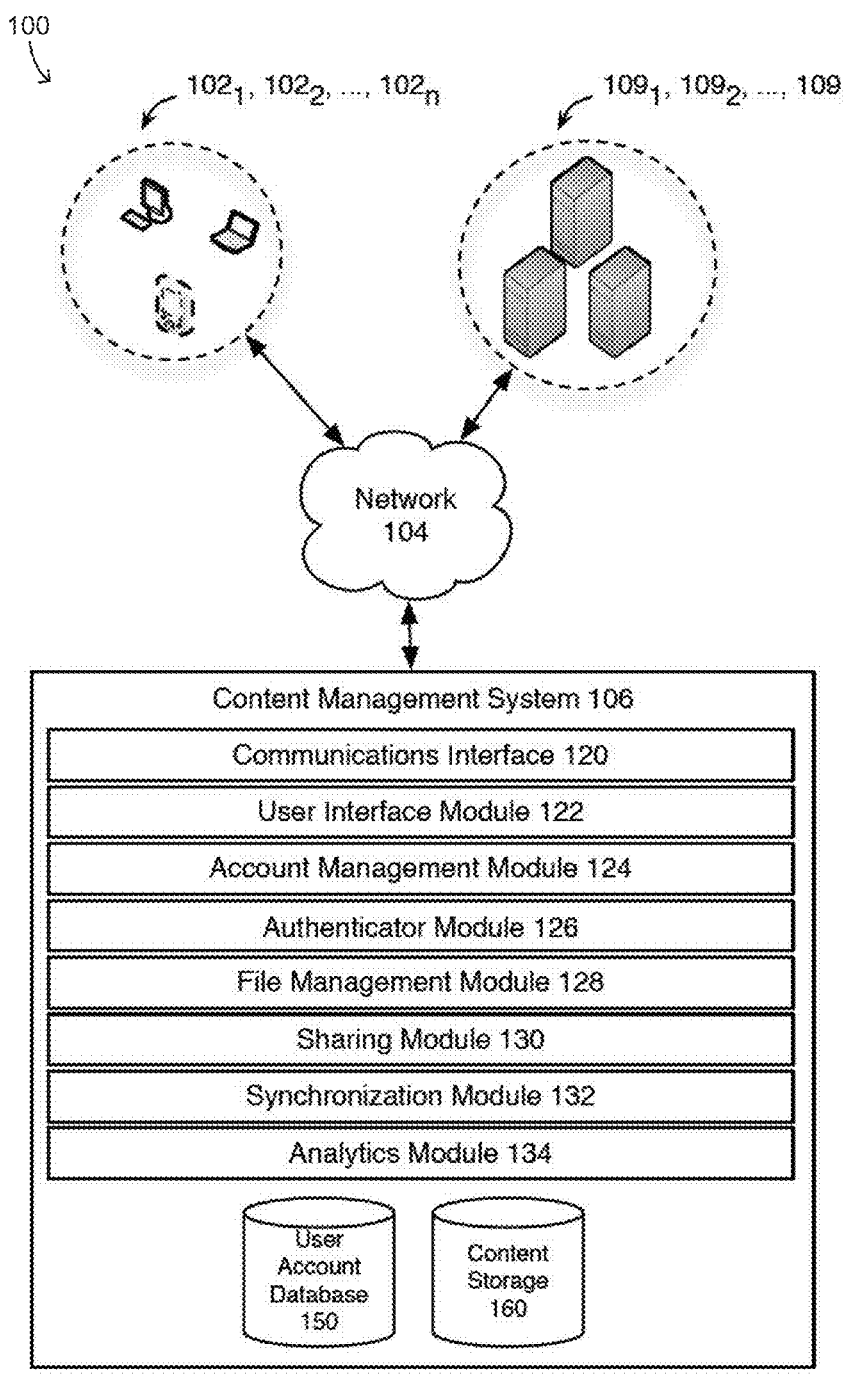
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
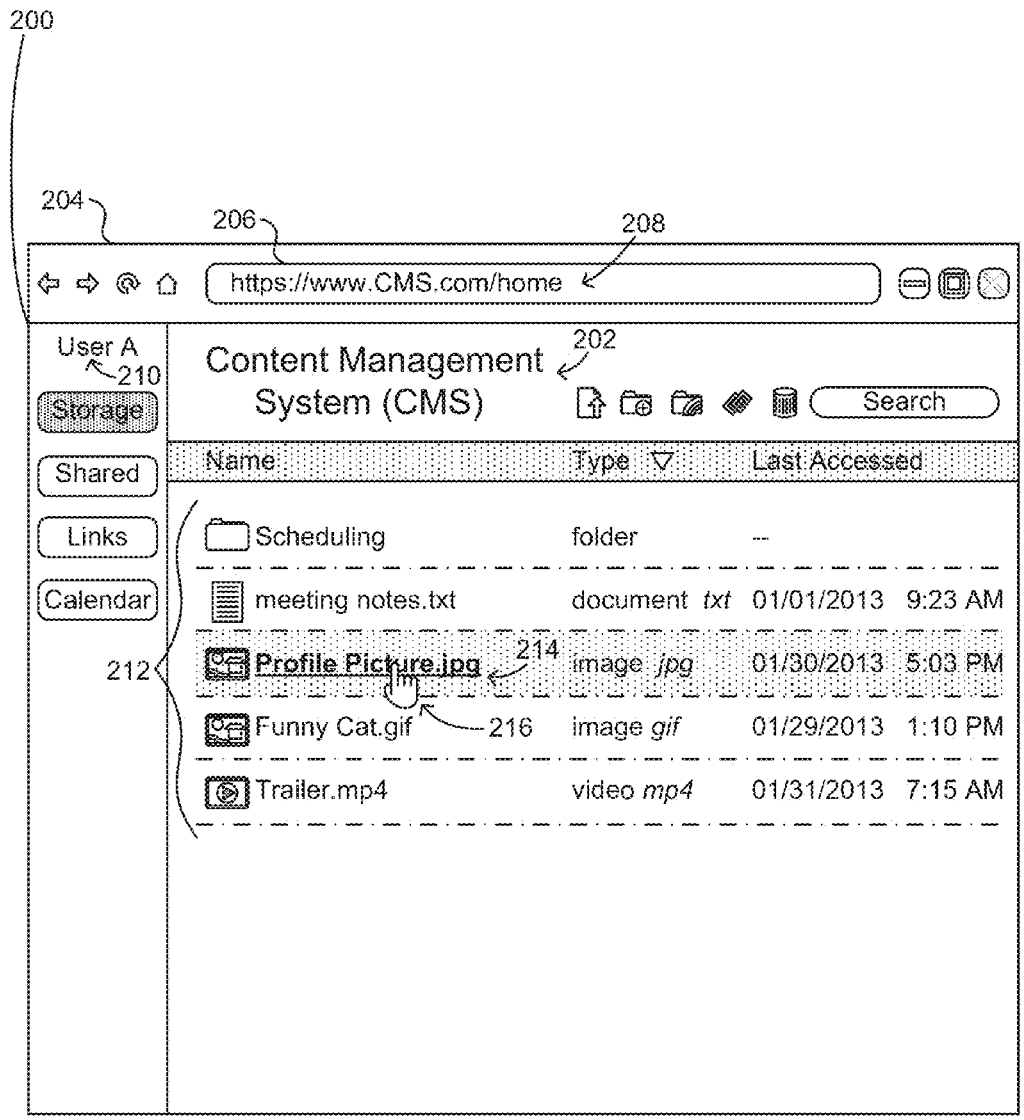
FIG. 2 shows an exemplary web interface for providing content preview including sharable information.

With reference now to FIG. 2, FIG. 2 shows an exemplary web interface for providing content preview including sharable information. Exemplary web interface 200 can be provided by content management system 202 (e.g., content management system 106 in FIG. 1). In some embodiments, exemplary web interface 200 can be rendered and displayed using web browsing application 204. Web browsing application 204 can correspond to a browser, an application (i.e., app) having browsing capabilities, etc. Web browsing application 204 can include address bar 206 (i.e., location bar, URL bar, etc.) for displaying a web location at which a user is currently navigating, browsing, interacting with, etc. In the example of FIG. 2, User A 210 can log on or sign into her account with content management system 202, and web interface 200 can provide a default (e.g., initial, home, etc.) page for User A 210 at web address "www.CMS.com/home" 208.

As shown in FIG. 2, the default page at web address "www.CMS.com/home" 208 can be associated with a directory (e.g., default directory, root directory, top-most directory, etc.) of User A's account with content management system 202. The directory can include a collection(s) of content items 212 that are owned or otherwise associated with User A 210. The collection(s) of content items 212 can include (but is not limited to) directories, sub-directories, files, albums, playlists, media, and/or other data. Although User A's default/home directory is shown in FIG. 2, this is for illustratively purposes only. Various other directories, portions of web interface 200, and/or approaches can be utilized to provide or present the collection(s) of content items 212.

In the example of FIG. 2, User A 210 may be interested in a content item, such as "Profile Picture.jpg" 214. User A 210 can interact with "Profile Picture.jpg" 214, such as by mouse-clicking on, tapping on, or otherwise interacting with "Profile Picture.jpg" 214. In this example, User A 210 can move mouse cursor 216 over "Profile Picture.jpg" 214. User A 210 can then perform a mouse click on "Profile Picture.jpg" 214. In some embodiments, the action(s) of User A 210 can cause content management system 202 to generate a preview for "Profile Picture.jpg" 214, as shown in FIG. 3.

Figure 3:
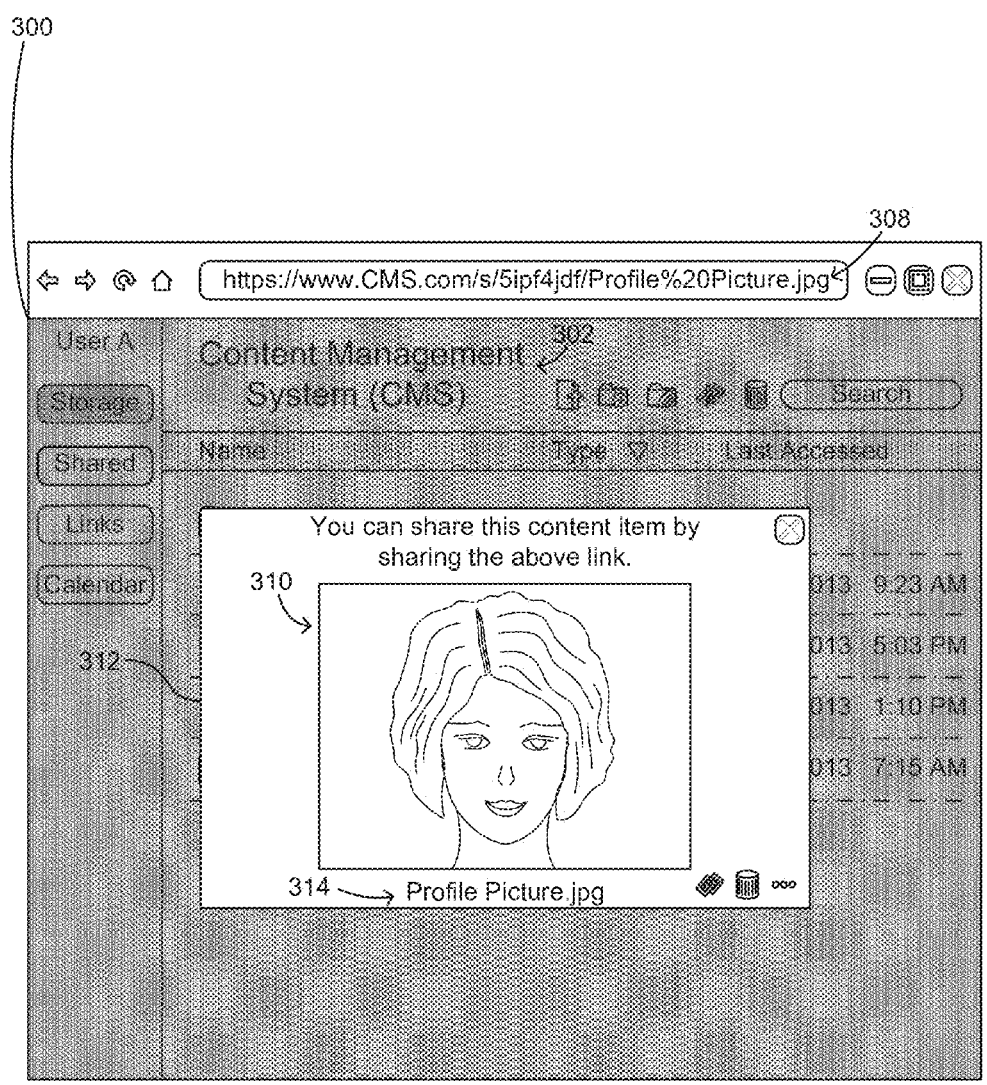
FIG. 3 shows an exemplary web interface for providing content preview including sharable information.

Turning now to FIG. 3, an exemplary web interface for providing content preview including sharable information is shown. Exemplary web interface 300 can be provided by content management system 302. As shown in FIG. 3, exemplary web interface 300 can provide a preview of a content item, such as image preview 310 for "Profile Picture.jpg" 314.

In one example, a user (e.g., User A 210 in FIG. 2) can cause the preview of the content item to be provided by web interface 300, such as by clicking on, hovering over, and/or otherwise interacting with an element (e.g., thumbnail, file name, etc.; e.g., element 214 in FIG. 2) representative of the content item to enable the preview for the content item to appear. Continuing with this example, the user (i.e., sharer)

may desire to share access to the content item with one or more other users (i.e., recipients). In conventional approaches, if the user attempts to share a web address (e.g., URL) associated with the preview of the content item, the content item will not be accessible to the recipient users via the web address. This is because conventional approaches typically only provide a non-sharable web address (e.g., URL) along with the preview of the content item. In other words, in conventional approaches, the web address associated with the preview of the content item does not lead to and/or provide access to the content item for the recipient users. However, various embodiments of the present disclosure can enable a web address (e.g., URL) or other machine readable-code associated with the preview of the content item to be sharable with one or more recipient users (and thus provide the recipients users with access to the content item).

In some embodiments, content management system 302 can generate a unique (i.e., substantially unique) token for the content item being previewed. In some cases, the unique token can correspond to a unique (i.e., substantially unique) web address, string of characters, QR code, electronic tag, and/or other machine-readable code that is representative of the content item being previewed (e.g., "Profile Picture.jpg" 314). For example, in some instances, content management system 302 can generate the unique token, web address, and/or machine readable code for a particular content item based, at least in part, on an identification (e.g., filename) of the content item and/or an identification (e.g., username) of the user (owner/sharer) associated with the content item.

In FIG. 3, web address (or machine-readable code) 308 can be uniquely representative of content item "Profile Picture.jpg" 314. Web address 308 can point and/or refer to an online location from which content item "Profile Picture.jpg" 314 (or a copy thereof) is accessible. Other web addresses would not provide access to content item "Profile Picture.jpg" 314. Also, other content items would not be accessible via web address 308.

As discussed above, web address 308 can be sharable information. In other words, the user (e.g., owner, sharer) associated with the previewed content item can give web address 308 to one or more other users (e.g., recipients). The one or more other users can navigate to web address 308 to view, download, or otherwise access content item "Profile Picture.jpg" 314.

Moreover, in some embodiments, content management system 302 can provide the preview of content item "Profile Picture.jpg" 314 via modal window 312. In some instances, a modal window (i.e., heavy window, modal dialog, etc.) can be a child window that requires a user to interact with it before the user can return to the previous (parent) window, interface, and/or state. Referring back to FIG. 3, in some cases, modal window 312 can provide options (e.g., via buttons, menus, interactive elements, etc.) to interact with and/or modify content item "Profile Picture.jpg" 314. For example, the preview (e.g., modal window 312) can be closed by selecting one of the options. In another example, a share link invitation interface can be initiated by selecting another option. In a further example, content item "Profile Picture.jpg" 314 can be deleted by selecting another option.

Further, although modal window 312 is shown to provide the preview of content item "Profile Picture.jpg" 314, it is contemplated that various other approaches, windows, interfaces, etc., can be utilized. For example, the preview of the content item can be provided via a new window of a browsing application. In another example, the preview of the content item can be provided via a new tab in a browsing application. In a further example, the preview of the content item can be provided by creating space on a current view and/or page (e.g., by shifting/moving other content away, by shrinking other content, etc.), without having to open a new interface, such as modal window 312.

Figure 4:
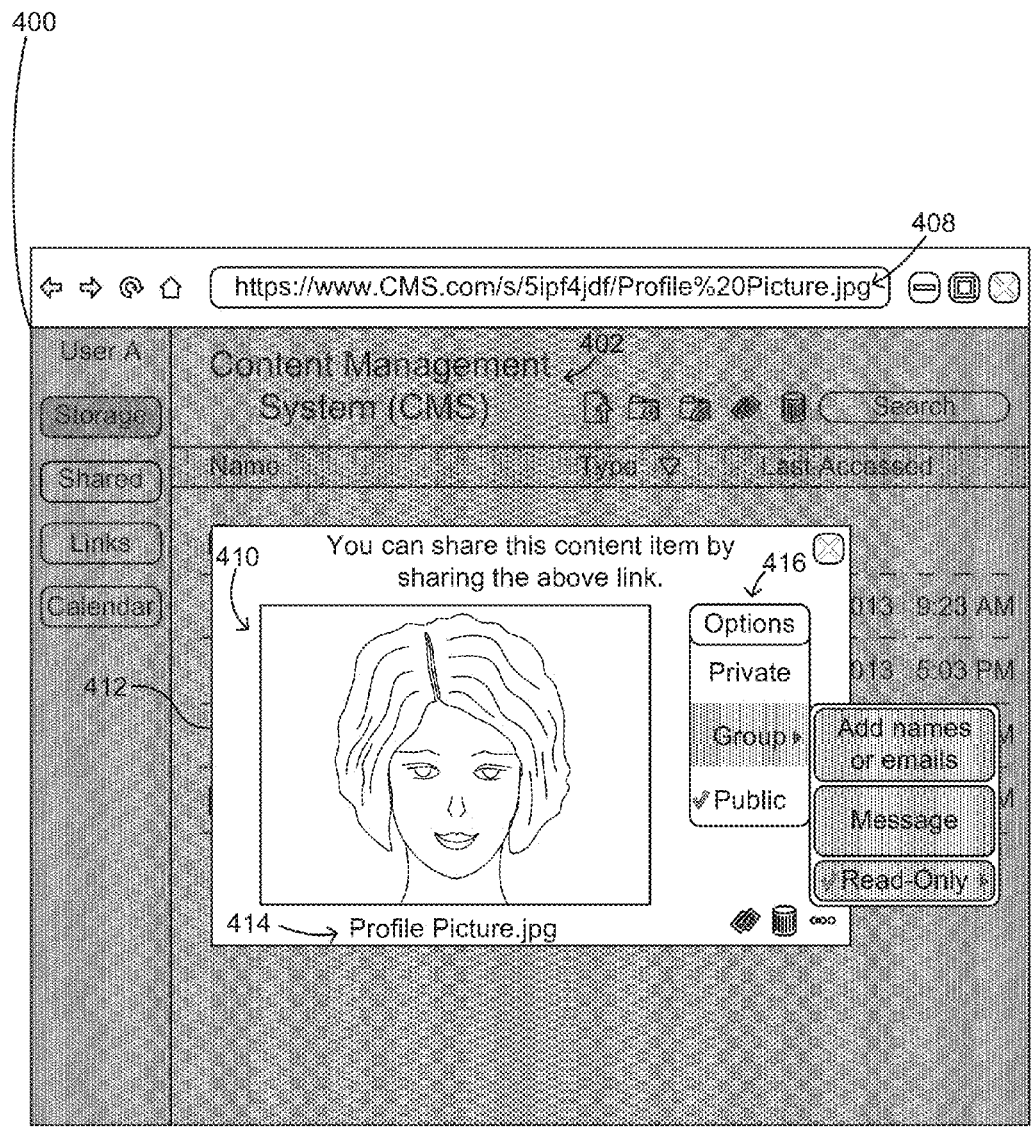
FIG. 4 shows an exemplary web interface for providing content preview including sharable information.

Referring now to FIG. 4, FIG. 4 shows an exemplary web interface for providing content preview including sharable information. In FIG. 4, content management system 402 can cause exemplary web interface 400 to provide a preview of a content item, such as image preview 410 of content item "Profile Picture.jpg" 414. In some cases, content management system 402 can cause web interface 400 to provide the preview in response to a user-initiated command or instruction (such as a user's clicking or tapping on the content item).

In addition, content management system 402 can generate a (substantially) unique token, identifier, etc., for the content item being previewed. As shown in FIG. 4, the unique token can correspond to web address 408 (or a URL address, QR code, machine-readable code, etc.) which is sharable and uniquely representative of content item "Profile Picture.jpg" 414. In some cases, web address 408 can be uniquely representative of content item "Profile Picture.jpg" 414 in that web address 408 uniquely links or refers to content item "Profile Picture.jpg" 414 (or a copy thereof). For example, web address 408 can be the only sharable web address that can provide access to content item "Profile Picture.jpg" 414, and/or content item "Profile Picture.jpg" 414 can be the only content item that is linked to or referred to by web address 408.

Moreover, in some embodiments, the web address can be generated (e.g., form, created, etc.) using characters that represent or form the unique token for the content item. In one example, if the unique token is a string of characters (or if the unique token is represented by the string of characters), then the web address can be the string of characters. In another example, a portion of the web address (e.g., a subset of characters forming the web address) can be the string of characters representing or forming the unique token In some embodiments, to provide additional functionality to content sharing, one or more options (e.g., 416) can be provided for configuring one or more access permissions associated with the content item (which can be shared). In the example of FIG. 4, one or more options (e.g., 416) can be provided in conjunction with image preview 410 of content item "Profile Picture.jpg" 414. In some instances, the one or more access permissions can be configured to limit which entities/accounts can be authorized to access content item 414. In some instances, the one or more access permissions can be configured to specify what kind of access an entity/account can have with respect to content item 414.

Regarding the limitation on which entities/accounts can be authorized to access a content item, the access permissions can be configured, for example, to specify whether the content item is private, accessible to a group, or public. In one example, if the content item is configured to be private, then the content item can only be accessible to a user associated with the content item, such as an owner of the content item. In another example, if the content item is configured to be accessible to a group of one or more authorized users, then only the authorized users can access the content item via the sharable web address (or other machine-readable code) for the content item. In a further example, if the content item is configured to be public, then all users who have the sharable web address for the content item can access the content item.

Regarding what kind of access an entity/account can have with respect to a content item, the access permissions can be configured, for example, to specify whether the entity/account has read-only access or read-write (i.e., read and write) access to interact with the content item. For example, read-only access allows the content item to be opened, viewed, played, etc., but does not allow for the content item to be modified and/or removed. In contrast, read-write access allows the content item to be opened, viewed, played, etc., as well as to be modified and/or removed.

Accordingly, in the example of FIG. 4, a sharer of web address 408 can still make sure that other unintended users do not have impermissible access to content item "Profile Picture.jpg" 414. For example, if web address 408 is shared with various entities/accounts, the original sharer can still manage which entities/accounts can have access to content item 414 via web address 408, as well as what kind of access those entities/accounts can have.

In addition, in some embodiments, there can be default settings for the access permissions. For example, the default access permission settings for a content item can be public and read-only, as shown in FIG. 4.

Figure 5:
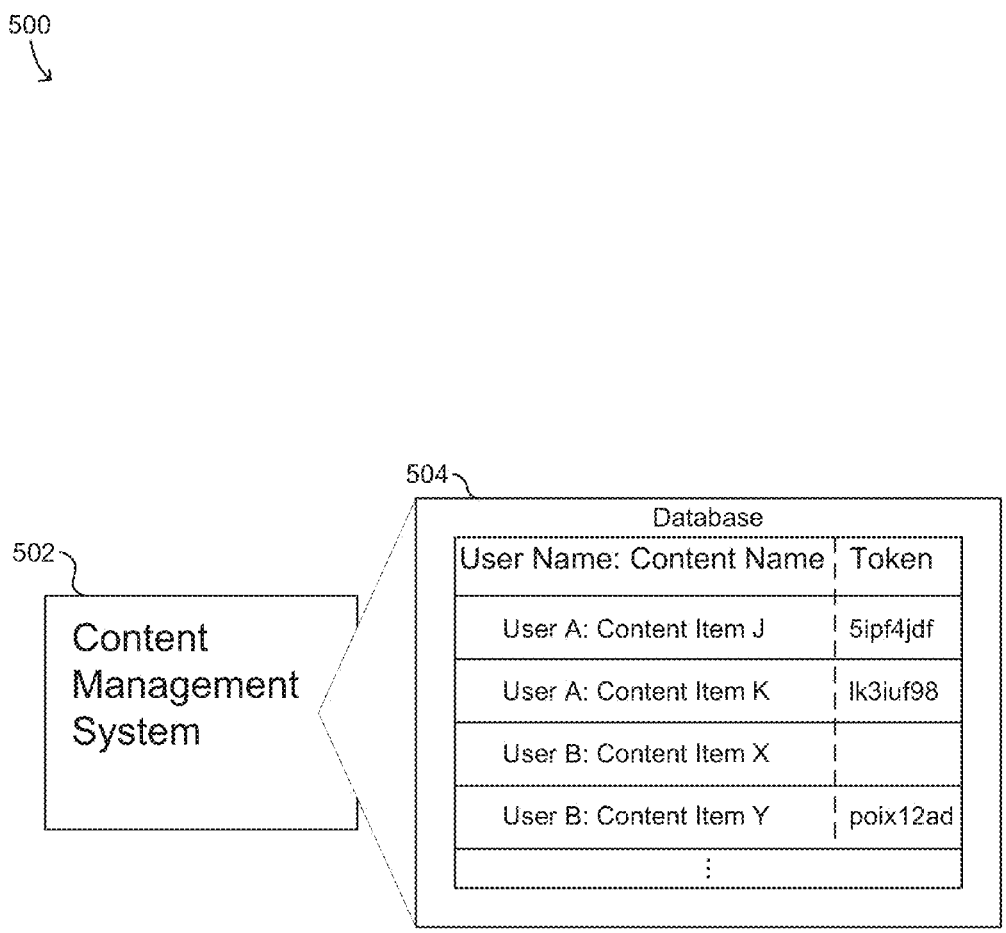
FIG. 5 shows an exemplary system embodiment providing content preview including sharable information.

FIG. 5 shows an exemplary system embodiment providing content preview including sharable information. Exemplary system embodiment 500 can include content management system 502. As discussed previously, in some embodiments, content management system 502 can generate or otherwise obtain a (substantially) unique token, which can correspond to a (substantially) unique web address, URL address, QR code, electronic/digital tag, or other machine-readable code that is representative of a content item. For example, the unique web address or other machine-readable code can represent a location from which the content item is accessible (e.g., viewable, executable, downloadable, etc.).

As shown in the example of FIG. 5, content management system 502 can check database 504 to determine whether or not a unique token, web address, and/or machine-readable code already exists (e.g., has already been generated) for a content item. The content item can be identified in database 504, for example, based on the name of the content item and/or the name of a user of the content item. If the unique token, address, or code for a content item already exists, such as when the content item was previously previewed and/or shared, then system 502 can use the already existing token, address, or code, without having to re-generate another one.

In some embodiments, the unique token, web address, and/or machine-readable code can be generated based on identifying information for the content item, identifying information about a user associated with the content item (e.g., an owner of the content item), or a combination of both. In one example, the unique token, address, or code can be generated using, at least in part, a hash algorithm. For example, a name of the content item and a name of the content item's owner can be inputted into the hash algorithm to produce output, which can be used to generate the unique token, address, or code. In some cases, the output from the hash algorithm can be the unique token, address, or code. In some cases, the output from the hash algorithm can form at least a portion or part of the unique token, address, or code.

Figure 6:
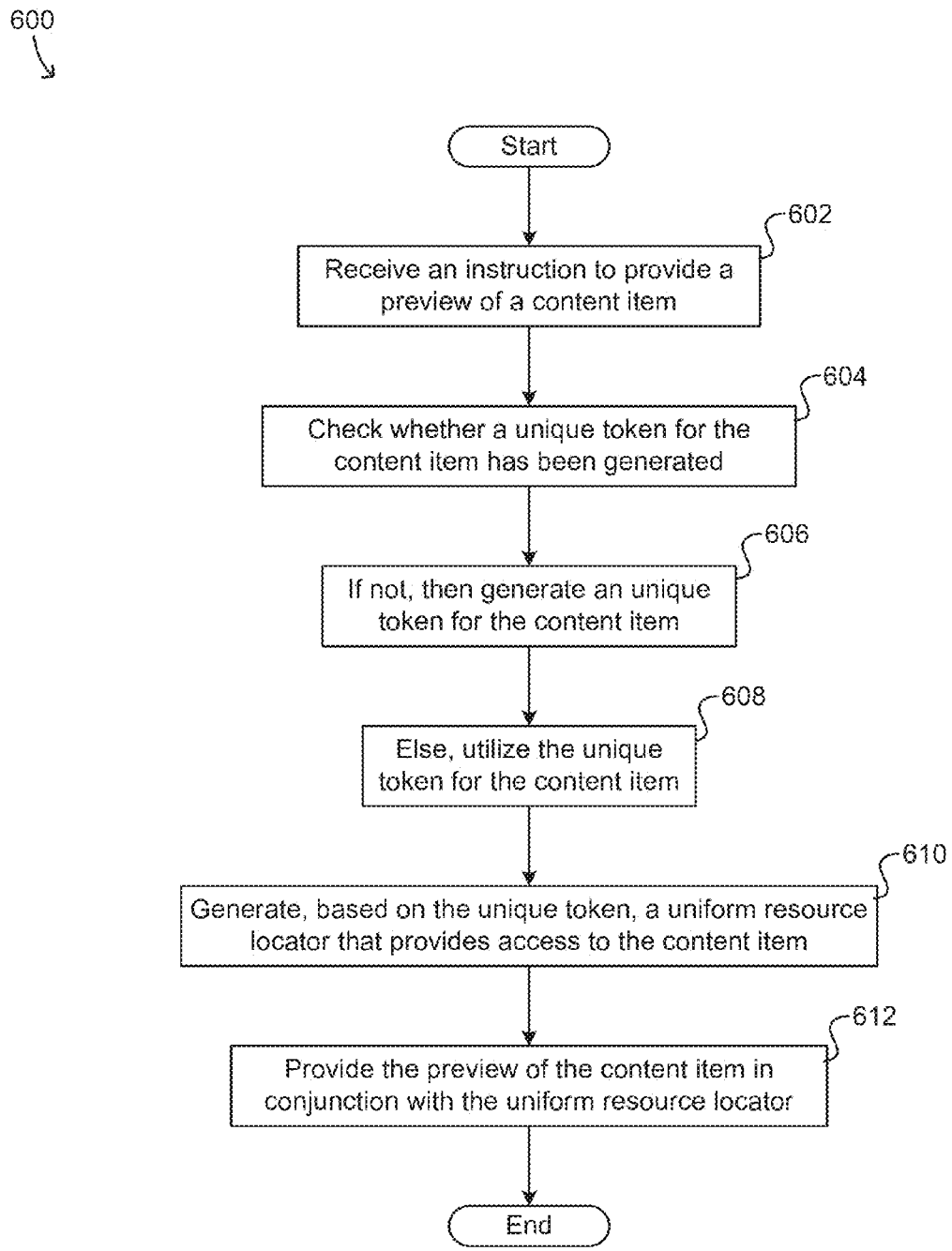
FIG. 6 shows an exemplary method embodiment for providing content preview including sharable information.

FIG. 6 shows an exemplary method embodiment for providing content preview including sharable information. It should be understood that there can be additional, fewer, or alternative steps performed in similar or alternative orders, or in parallel, within the scope of the various embodiments unless otherwise stated. At step 602, exemplary method embodiment 600 can receive an instruction from a user account to provide a preview of a content item stored at an online content management system. For example, a user can click, tap, or otherwise interact with a representation of a content item presented via a web interface of a content management system to cause the preview of the content item to be generated.

At step 604, exemplary method 600 can check whether a (substantially) unique token for the content item has been generated. In some embodiments, the content management system can check a database to determine whether a unique token for a content item already exists. If the unique token has yet to be generated (or does not yet exist), exemplary method 600 can generate a unique token for the content item, at step 606. Or otherwise, exemplary method 600 can utilize the (already generated/existing) unique token for the content item, at step 608.

Step 610 can include generating a uniform resource locator (URL) based, at least in part, on the unique token for the content item. The uniform resource locator can provide access to the content item via the content management system. In some embodiments, the URL can be generated (e.g., form, created, etc.) using characters that represent or form the unique token for the content item. In one example, if the unique token is a string of characters (or if the unique token is represented by the string of characters), then the URL can be the string of characters. In another example, a portion of the URL (e.g., a subset of characters forming the URL) can be the string of characters representing or forming the unique token.

Then at step 612, method 600 can provide the preview of the content item in conjunction with the uniform resource locator that provides access to the content item. Further, in some embodiments, a notification (e.g., message, signal, communication) indicating that the uniform resource locator is sharable with one or more recipient accounts can be provided as well. Moreover, in some embodiments, the unique token can be set to expire at a specified time or after a specified duration.

Figure 7:
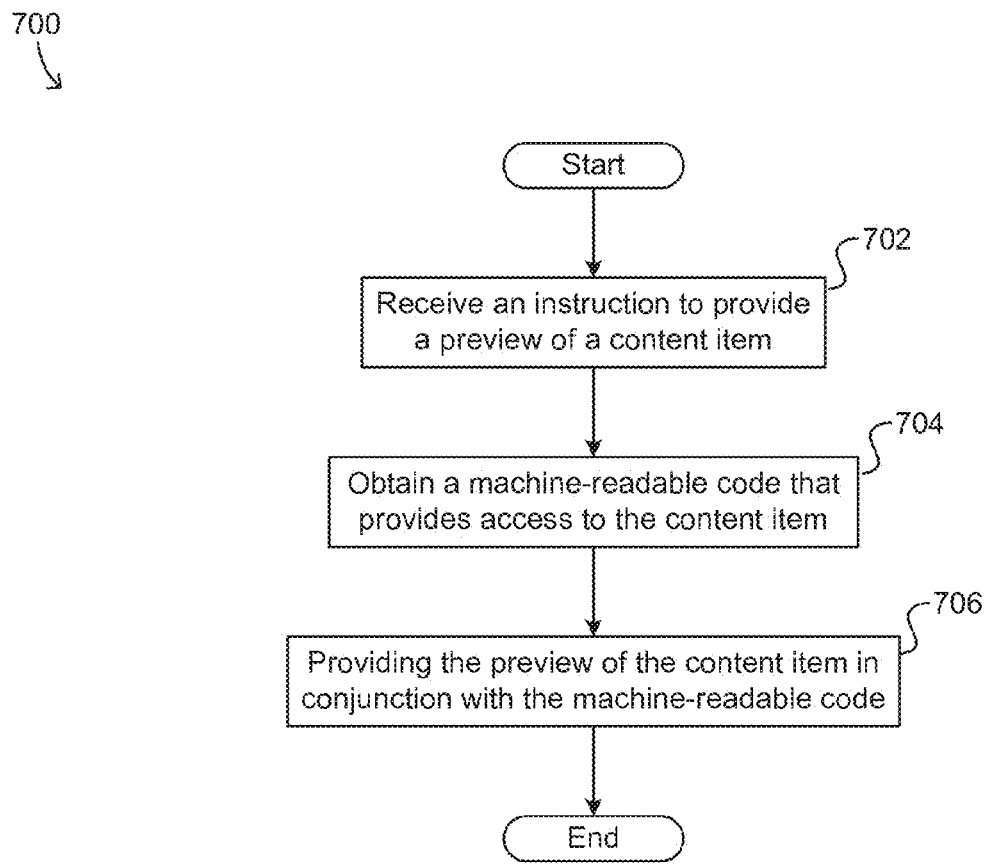
FIG. 7 shows an exemplary method embodiment for providing content preview including sharable information.

FIG. 7 shows an exemplary method embodiment for providing content preview including sharable information. As previously mentioned, it should be understood that there can be additional, fewer, or alternative steps performed in similar or alternative orders, or in parallel, within the scope of the various embodiments unless otherwise stated. Exemplary method embodiment 700 can receive an instruction to provide a preview of a content item stored at a content management system, at step 702.

At step 704, method 700 can obtain a machine-readable code that provides access to the content item via the content management system. For example, the content management system can generate or retrieve the machine-readable code that provides access to the content item. In some cases, the machine-readable code can be generated based on identification information for the content item and/or for a user associated with the content item (e.g., an owner of the content item). Also, the machine-readable code can be (substantially) uniquely representative of the content item. For example, the machine-readable code can have a (nearly) one-to-one correspondence to the content item. Then, step 706 can include providing the preview of the content item in conjunction with the machine-readable code.

Figure 8:
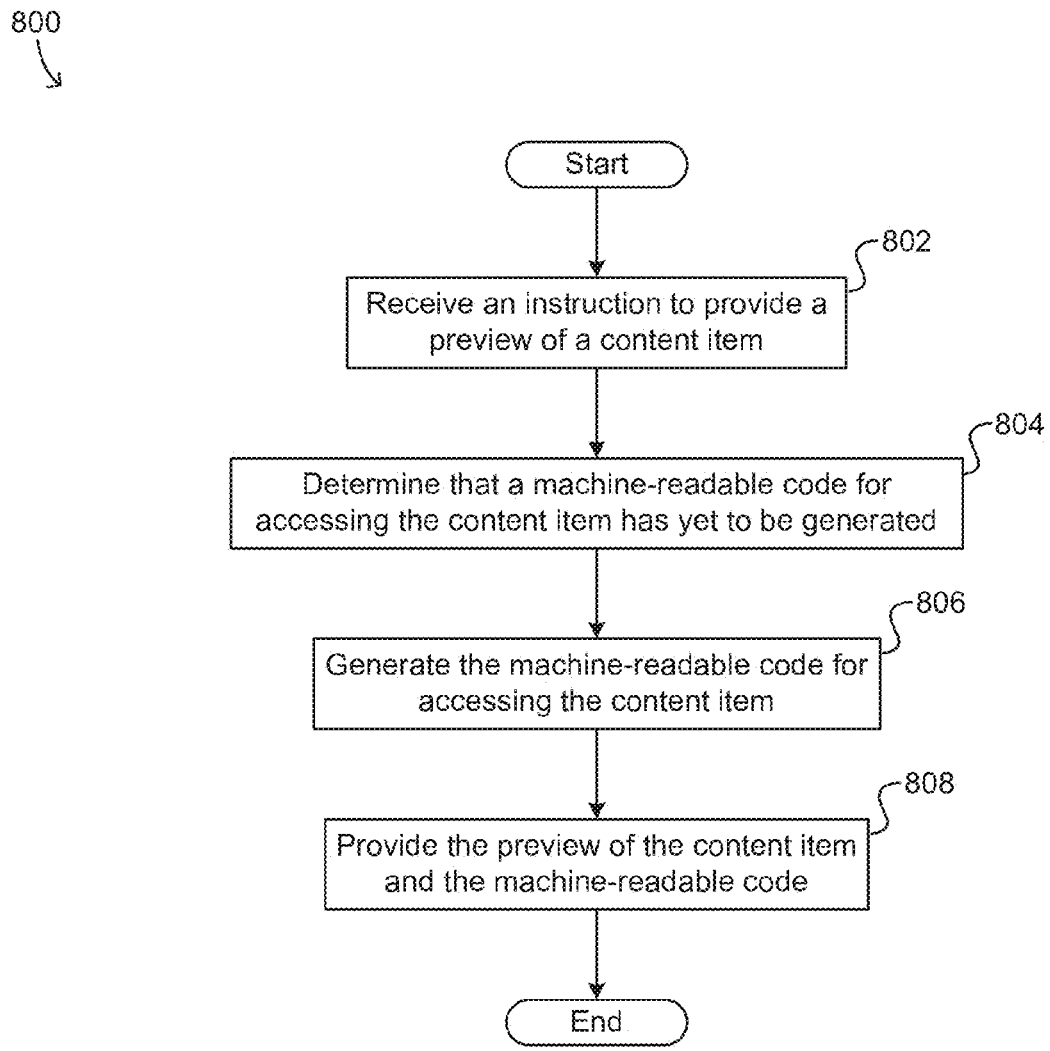
FIG. 8 shows an exemplary method embodiment for providing content preview including sharable information.

FIG. 8 shows an exemplary method embodiment for providing content preview including sharable information. Again, it should be understood that there can be additional, fewer, or alternative steps performed in similar or alternative orders, or in parallel, within the scope of the various embodiments unless otherwise stated. Exemplary method embodiment 800 can receive an instruction to provide a preview of a content item stored at a content management system, at step 802. At step 804, exemplary method 800 can determine that a machine-readable code uniquely representative of a web location for accessing the content item has yet to be generated.

Then step 806 can include generating the machine-readable code that uniquely represents the web location for accessing the content item. Method 800 can then provide the preview of the content item in conjunction with the machine-readable code, at step 808.

With reference now to FIG. 9A and FIG. 9B, FIG. 9A and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for providing content item preview and sharable information, comprising:
   at least one processor;
   one or more computer readable media; and
   computer readable instructions, stored on the one or more computer readable media, that when executed by the at least one processor, cause the system to:
      receive an instruction from a user account associated with an online content management system to provide a preview of a content item associated with a unique identifier assigned by the online content management system and stored at the online content management system, the preview contains a portion of the content item, and wherein the preview of the content item is associated with a unique token distinct from the unique identifier;
      generate, in association with the unique token, the preview of the content item; and
      determine, in association with the preview of the content item and based at least in part on the unique token, access permissions to the content item, the access permissions permitting access to the content item stored at the online content management system.

2. The system of claim 1, wherein the unique token for the content item is generated based, at least in part, on an output produced from hashing identification information for the content item.

3. The system of claim 1, wherein the computer readable instructions further cause the system to:
   provide, in conjunction with the preview of the content item, a notification indicating that the content item is sharable with one or more recipient accounts.

4. The system of claim 1, wherein the computer readable instructions further cause the system to:
   provide one or more options for the user account to configure access permissions associated with the content item.

5. The system of claim 4, wherein the one or more options enable the user account to configure the access permissions associated with the content item as being publicly accessible, accessible to one or more selected recipient accounts, or accessible to the user account.

6. The system of claim 4, wherein the one or more options enable the user account to configure at least a portion of the access permissions associated with the content item as corresponding to read-only access or read-write access.

7. The system of claim 1, wherein the computer readable instructions further cause the system to:
   receive data indicating that a recipient has attempted to access the content item;
   provide the recipient with access to the content item; and
   set the unique token to expire at a specified time or after a specified duration.

8. A computer-implemented method, comprising:
   receiving an instruction at a content management system to provide a preview of a content item that contains a portion of content of the content item, wherein the content item is associated with a unique identifier assigned by the content management system and stored at the content management system;
   obtaining a machine-readable code, by the content management system, distinct from the unique identifier, that provides access to the preview of the content item via the content management system, the machine-readable code being uniquely representative of the preview of the content item; and
   determining, in association with the preview of the content item and based at least in part on the machine-readable code, access permissions to the content item, the access permissions permitting access to the content item via the content management system.

9. The computer-implemented method of claim 8, further comprising:
   providing, in conjunction with the preview of the content item, information indicating that the machine-readable code is sharable with one or more recipient accounts.

10. The computer-implemented method of claim 8, further comprising:
    receiving data indicating that a recipient has attempted to access the content item using the machine-readable code; and
    providing the recipient with access to the content item.

11. The computer-implemented method of claim 8, further comprising:
    providing one or more options to configure access permissions associated with the content item.

12. The computer-implemented method of claim 11, wherein the one or more options enable the access permissions associated with the content item to be configured as being publicly accessible, accessible to one or more selected recipient accounts, or accessible to a user account associated with the content item.

13. The computer-implemented method of claim 11, wherein the one or more options enables at least a portion of the access permissions associated with the content item to be configured to correspond to read-only access or read-write access.

14. The computer-implemented method of claim 8, wherein the machine-readable code comprises at least one of a uniform resource locator (URL), a barcode, or a quick response (QR) code.

15. A non-transitory computer-readable storage medium including instructions that, when executed by at least one processor of a content management system, cause the content management system to:

receive an instruction to provide a preview of a content item that contains a portion of content of the content item, wherein the content item is associated with a unique identifier assigned by the content management system and stored at the content management system;

determine whether machine-readable code for accessing the preview of the content item, distinct from the unique identifier, has yet to be generated;

generate and associate a machine-readable code for accessing the preview of the content item; and determine, in association with the preview of the content item and based at least in part on the machine-readable code, access permissions to the content item, the access permissions permitting access to the content item stored at the content management system.

16. The non-transitory computer-readable storage medium of claim 15, wherein the instructions cause the computing system to further:

provide, in conjunction with the preview of the content item, information indicating that the machine-readable code is sharable with one or more recipient accounts.

17. The non-transitory computer-readable storage medium of claim 15, wherein the machine-readable code is generated based, at least in part, on identification information for the content item.

18. The non-transitory computer-readable storage medium of claim 15, wherein the instructions cause the computing system to further:

providing one or more options to configure access permissions associated with the content item.

19. The non-transitory computer-readable storage medium of claim 18, wherein the one or more options enable the access permissions associated with the content item to be configured as being publicly accessible, accessible to one or more selected recipient accounts, or accessible to a user account associated with the content item.

20. The non-transitory computer-readable storage medium of claim 18, wherein the one or more options enables at least a portion of the access permissions associated with the content item to be configured to correspond to read-only access or read-write access.

* * * * *